Figure 1:
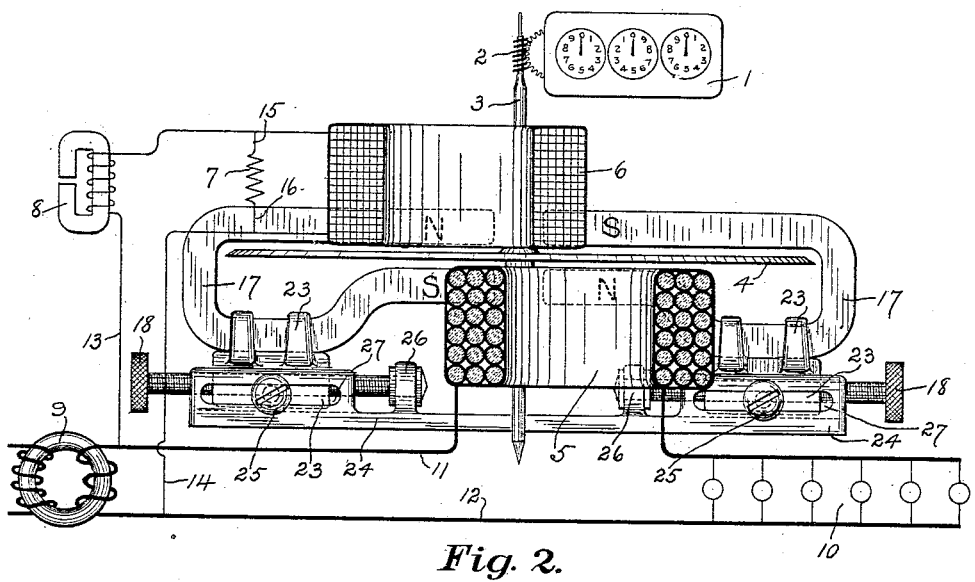

No. 698,639. Patented Apr. 29, 1902.
T. DUNCAN.
ELECTRIC METER.
(Application filed Apr. 11, 1898.)

(No Model.) 4 Sheets—Sheet 1.

Witnesses
Samuel R. Bachtel.
Adelaide Kearns.

Thomas Duncan Inventor.
By his Attorneys Chapin & Denny

No. 698,639.  
T. DUNCAN.  
ELECTRIC METER.  
(Application filed Apr. 11, 1898.)  
Patented Apr. 29, 1902.

(No Model.)  
4 Sheets—Sheet 2.

Witnesses  
Adelaide Kearns  
Edward F. Tierney

Thomas Duncan Inventor  
By his Attorneys Chapin & Denny

No. 698,639.  
T. DUNCAN.  
ELECTRIC METER.  
(Application filed Apr. 11, 1898.)  
Patented Apr. 29, 1902.

(No Model.)  
4 Sheets—Sheet 3.

Witnesses  
Adelaide Kearns  
Edward F. Tierney

Thomas Duncan, Inventor  
By his Attorneys Chapin & Denny

No. 698,639. Patented Apr. 29, 1902.
T. DUNCAN.
ELECTRIC METER.
(Application filed Apr. 11, 1898.)

(No Model.) 4 Sheets—Sheet 4.

Witnesses
Samuel A. Bachtel.
Adelaide Kearns.

Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,639, dated April 29, 1902.

Application filed April 11, 1898. Serial No. 677,111. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in integrating motor-meters for alternating electric currents which are specially adapted for circuits or loads containing inductance or lagging currents.

The object of my present invention is to provide in electric meters a method of and means for producing a lag of the magnetism of the volt-coil a quarter-period or ninety degrees behind the electromotive force of the circuit or system of supply to enable the meter to accurately measure loads containing self-induction or lagging currents.

My invention comprises in its preferred embodiment an electric meter having a magneto-electric drag for governing the speed, whose retardation will be permanent in value and not easily affected or deranged by external magnetism, having such an arrangement of the retarding-magnets that a considerable change in retardation will be effected by a slight variation in the position of the magnets themselves, and having a rate of rotation at all times proportional to the actual electrical energy passing through the meter, whether it be lamps, motors, or choke-coils which constitute the load.

Another object is to provide a simplicity of construction not liable to change or derangement after adjustment for quadrature.

Similar reference-numerals in the accompanying drawings represent like parts in the several views, in which—

Figure 2:
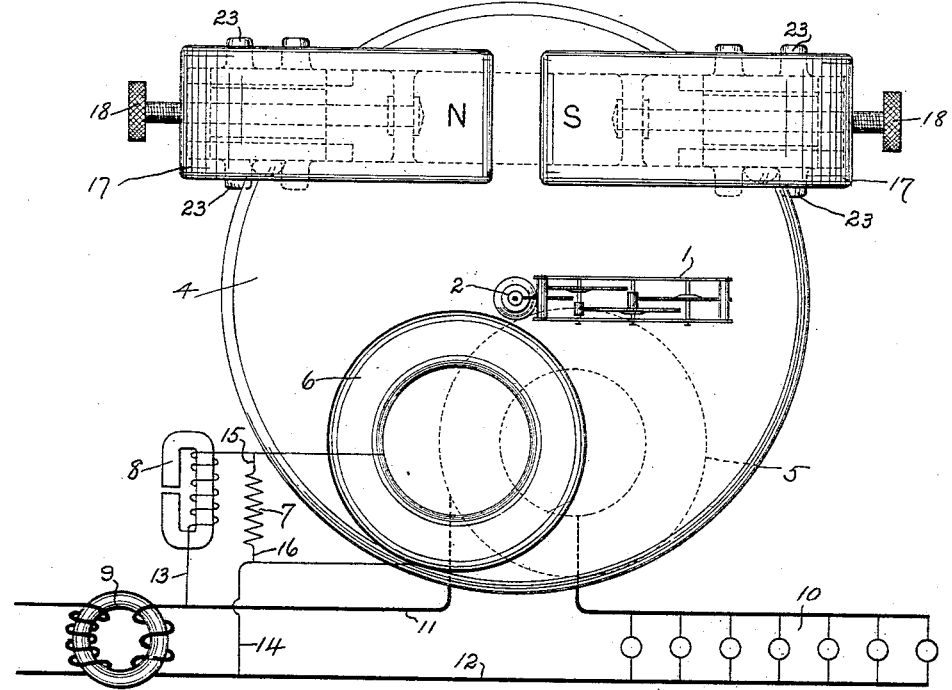
Figure 3:
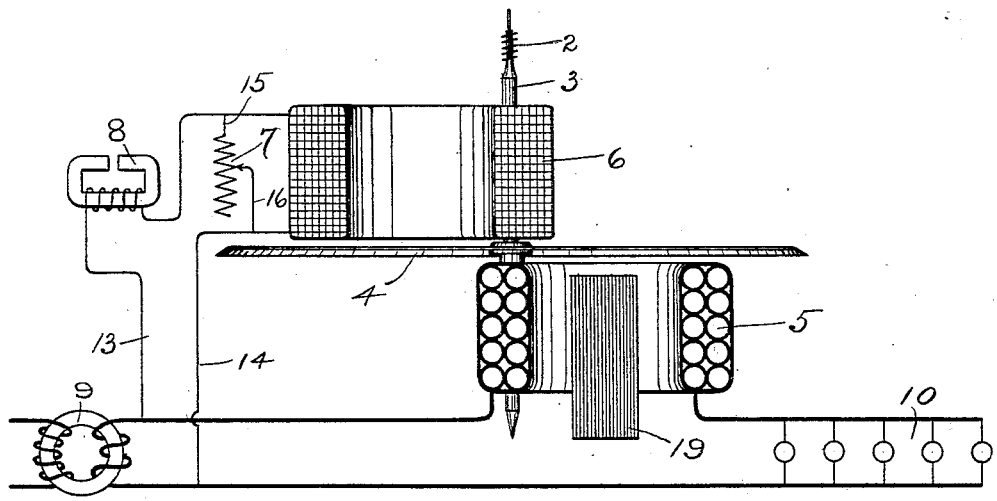
Figure 4:
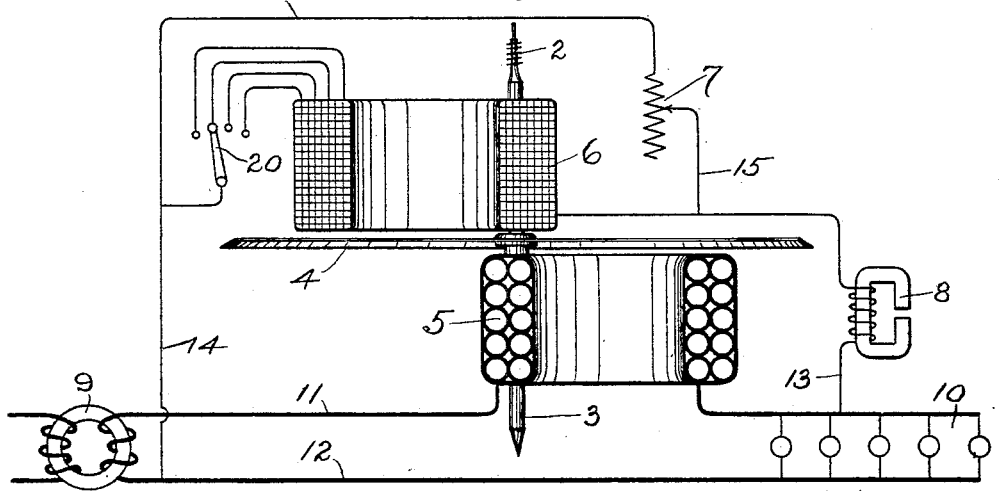
Figure 5:
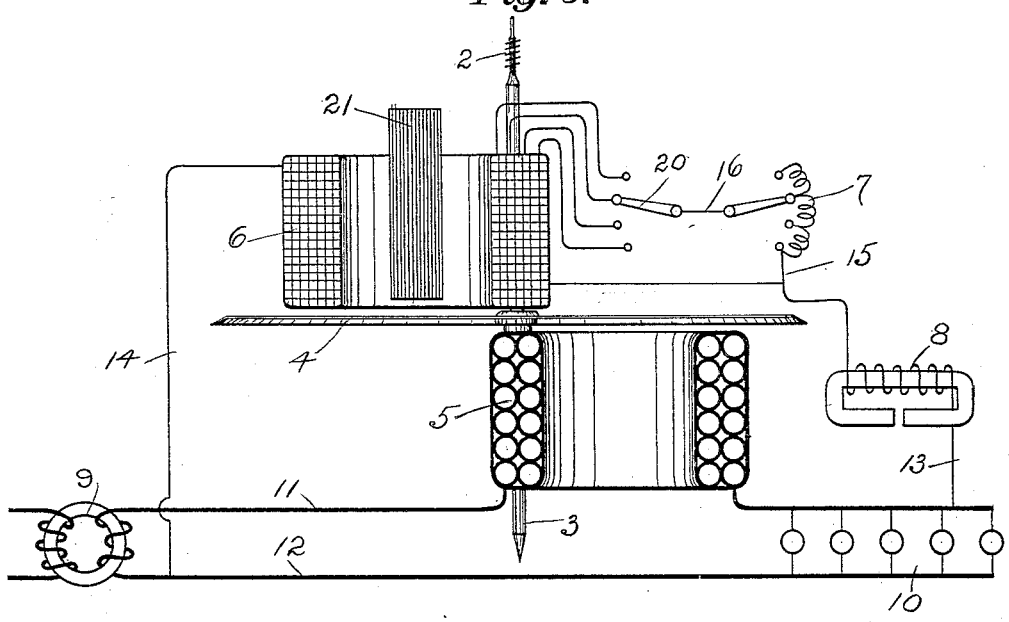
Figure 6:
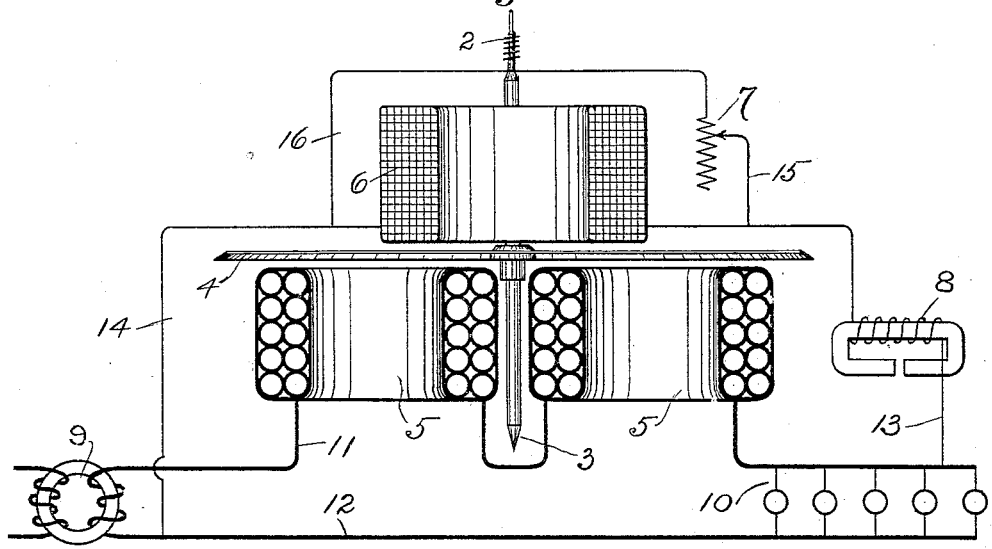
Figure 7:
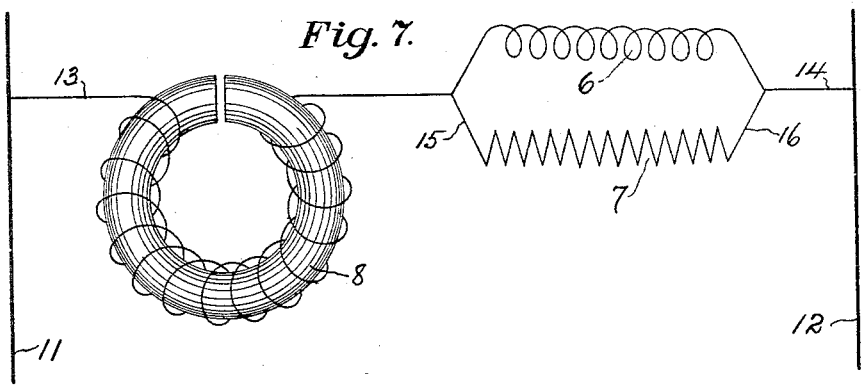
Figure 8:
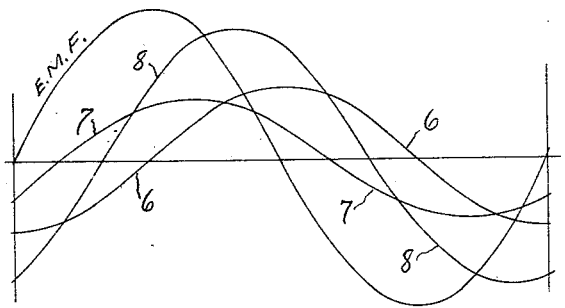
Figure 9:
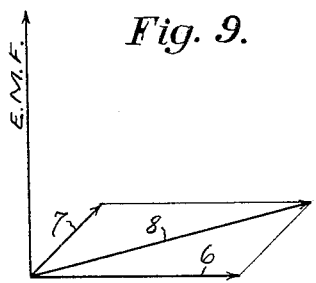

Figure 1 is a vertical central section of my improvement, showing the relative arrangement of the energizing-coils and retarding-magnets. Fig. 2 is a plan view of the same, showing the manner of arranging the retarding-magnets which embrace the adjacent portion of the armature and are adapted to adjust the speed of rotation thereof. Fig. 3 is a similar view to Fig. 1, excepting that it shows an iron core arranged within the series field-coil. Fig. 4 shows a movable contact-switch which is employed to cut in more or less of the convolutions of the volt-coil and around which the resistance 7 is shunted. Fig. 5 is a substantially similar view to Fig. 4 and also shows an iron core arranged in the volt-coil. Fig. 6 shows the manner of employing two series field-coils in my improvement. Fig. 7 is a diagrammatic view showing the arrangement of the shunt-circuit of the meter. Figs. 8 and 9 show the phases of the currents in the several circuits of Fig. 7, more fully described hereinafter.

A description of my improvement with special reference to Fig. 1 is as follows: The generator 9 is connected to the work-circuit 10 through the series field-coil 5 by means of the main leads 11 and 12. A revoluble aluminium disk armature 4 is rigidly and concentrically mounted in any suitable manner upon a proper upright supporting-spindle 3, provided with proper bearings at its extremities, and has a worm 2 near its upper extremity adapted to mesh with the registering-train 1 in the usual manner. The said series field-coil 5 is arranged and rigidly supported adjacent to the lower face of said disk armature and in inductive relation thereto. A shunt or volt coil 6 is arranged adjacent to the upper face of said armature and in inductive relation thereto. This volt-coil is connected in parallel to the two main leads 11 and 12 by means of the wires 13 and 14. The said series field-coil 5 is energized by the current supplying the work-circuit 10, and its magnetic strength will vary directly as the current in amperes passing through it. An impedance-coil 8 is connected in series with the said volt-coil 6 to cause a lag of the current in this circuit approximating ninety degrees, and a non-inductive resistance 7 is shunted around the terminals of the said volt-coil to assist in bringing the lag of the current through said coil up to ninety degrees. When the work-circuit 10 is non-inductive, the current supplying it will be in step or phase with the electromotive force of the generator, and as the magnetism is in phase with its current we may assume that the magnetism of the series field-coil 5 is also in step with the electromotive force of the generator.

The manner in which a lag of the magnetism of the volt-coil amounting to ninety degrees or a quarter-period behind the generator or line electromotive force is produced by my present invention for the purpose of measuring inductive loads in which the current and magnetism of the work-circuit and the series coil lag behind the electromotive force of the generator is briefly stated as follows: When the impedance-coil is connected in series with the volt-coil, the current through it will lag nearly ninety degrees; but for well-understood reasons the lag of this current must be somewhat less than ninety degrees. If the lag of the current in the impedance-coil is, say, eighty-five degrees behind the current through the volt-coil, the additional lag of five degrees necessary to obtain quadrature is obtained by shunting the non-inductive resistance 7 around the terminals of the volt-coil, then varying the resistance of the former until the current through the volt-coil is in the desired quadrature. If the coil 6 and the resistance 7, which are in parallel to each other, have the same resistance and self-induction, the currents through them will be in phase with each other and with the current in the circuit-wires 13 and 14; but when the self-induction of the resistance 7 is decreased its current will be advanced in phase ahead of the current in the said coil 6 and in the said circuit 13 and 14, at the same time the current through the coil 6 will have its lag increased by an approximately equal number of degrees behind the current in the said circuit or shunt connections 13 and 14. Obviously, therefore, if the current in the circuits 13 and 14 be caused to lag, say, eighty-five degrees by means of the impedance-coil 8 and the volt-coil 6 and by varying the resistance 7 until its current advances in phase five degrees ahead of the current through the impedance-coil, which is eighty-five degrees, the current through the volt-coil will be made to lag five degrees. This gives approximately the current flowing through the circuit 13 and 14 a lag of eighty-five degrees behind the pressure of the mains 11 and 12 and eighty-five degrees less five degrees, or eighty degrees, for the current through the resistance 7, and it gives eighty-five degrees plus five degrees, or ninety degrees, for the current through the volt-coil 6. As the current and magnetism of said coil 6 are in phase with each other, the said magnetism acting inductively upon the disk armature and representing the electromotive force of the circuit 11 and 12 is also ninety degrees behind the said pressure. Obviously when there is no inductance in the work-circuit 10 the magnetism of the series coil 5 will be in phase with the line or generator pressure and the magnetism of the coil 6 representing the said line-pressure will lag ninety degrees behind the said pressure and the series-coil magnetism.

Fig. 7 shows diagrammatically the arrangement of the several circuits comprising the shunt or volt circuit of the meter.

Fig. 8 shows, by means of sine curves, the relative values and lags of the currents in the impedance-coil 8, volt-coil 6, and resistance 7 and their relation to the electromotive-force curve of the circuit. Fig. 9 shows the same result by employing the parallelogram of forces to represent the electromotive forces by electromotive force, the current 7 through the resistance 7, the current 6 through the volt-coil 6, and the current 8 through the impedance-coil 8 and the wires 13 and 14, as the resultant of the two currents 6 and 7. This difference of phase between the volt-coil and the series or ampere coil produces a laterally-shifting magnetic field and adapted to actuate the armature.

The torque produced with a given current and pressure will vary as the sine of the angle between the magnetisms of the series and volt coils and will at any instant represent the real or actual watts in the work-circuit 10.

When the current through the series coil 5 lags behind the line-pressure, say, forty-five degrees, due to the introduction of an inductive load in the circuit, the magnetism of the coil 5 will also lag forty-five degrees, which gives it an advance of only forty-five degrees ahead of the magnetism of the said coil 6 instead of ninety degrees, as above described.

Assuming that the current and pressure are the same in both cases, the real watts will now be only .7071 of the original watts, when no lag existed, or as the cosine of the angle of said lag, and as the torque exerted upon the disk armature varies as the sine of the angle of lag between the flux of the series coil and the flux of the volt-coil the resultant torque will be just .7071 of the original torque, since the sine of forty-five degrees is .7071, or equal to the real watts and the two angles complementary. The retarding-magnets 17 are arranged upon both sides of the disk armature and embracing the same, as shown in Fig. 1, with their unlike poles facing each other. The retarding-magnets are secured to the clamps 23 to permit the necessary adjustment thereof. The clamps slide in suitable guides in the casting 24, and when the proper adjustment is made the said clamps are secured to said guides 24 by means of the set-screw 25 in the slot 27 of the casting 24. The said clamps and the magnets are adjusted by means of the screw 18, whose inner end is properly secured in the portion 26 of the casting 24, and by rotating said screw 18 the clamps 23, with their corresponding magnets, are horizontally adjusted. The speed of said armature is regulated by a horizontal adjustment of said magnets toward or from each other. By adjusting said magnets closer together more lines of force from each magnet are attracted or short-circuited by the other, thereby diminishing the number of effective lines of force acting upon the armature, and thus reducing the drag and permitting an increase of speed of said armature. By withdrawing said magnets or further separating them less of this short-circuiting takes place and permits an increased number of lines of force from each magnet to act upon the armature, thereby increasing the dragging effect. This adjustment can readily be effected by the set-screws 18 or other proper manner. These magnets may also be so adjusted that their magnetism will cut the disk armature at any desired point between its perimeter and its axis. The manner thus described of arranging the said magnets with their unlike poles in close proximity to each other, whereby a mutual short-circuiting takes place between them, has the advantage that each of said magnets acts as a keeper or preserver for the other and also greatly reduces the detrimental effects of external magnetic influences upon the said magnets, thereby obtaining great permanency in the strength of the magnets—an essential feature to secure reliable efficiency in a meter. I preferably employ a single disk 4, which in this instance acts in a double capacity, it being an armature and also acting as a retarding element. I do not wish, however, to be limited to a meter wherein the retarding element and the armature are made in one part.

I do not hereby limit myself to the arrangement of the energizing-coils herein shown and described, as my invention can be employed with equal facility in any form of induction-wattmeter having either a cylindrical or other form of armature. I prefer to employ means, as the switch 20, for varying the number of effective turns of the coil 6 to secure adjustment more effectively.

My described arrangement of magnets may be indefinitely varied, and any desired number may be employed. If desired, these magnets may be employed to secure the necessary retardation by having them act upon a second metallic disk.

Having thus described my invention and the manner of employing the same, what I desire to secure by Letters Patent is—

1. In an electric meter, a retarding device consisting of a pair or plurality of pairs of permanent magnets having the adjacent unlike poles of each pair arranged in coöperative relation upon the same side of the revoluble disk armature as shown, a revoluble metallic disk armature in inductive relation to said retarding device, and means for adjusting said magnets to vary the density of the flux through said revoluble armature.

2. In a meter, the combination with a current-winding, of a measuring element actuated thereby, a retarding element movable with the measuring element, and permanent magnets, the unlike poles of the permanent magnets being opposed, each magnet offering a path for lines of force due to the other, the retarding element being interposed between the poles of each magnet, the unlike opposed poles being upon the same side of the retarding element, the current-winding serving to effect an increase in the magnetization of one permanent magnet corresponding to the decrease in the magnetization of the other permanent magnet effected by said winding, substantially as described.

3. In a meter, the combination with a current-winding, of a measuring element actuated thereby, a retarding element movable with the measuring element, permanent magnets, the unlike poles of the permanent magnets being opposed, each magnet offering a path for lines of force due to the other, the retarding element being interposed between the poles of each magnet, the unlike opposed poles being upon the same side of the retarding element, the current-winding serving to effect an increase in the magnetization of one permanent magnet corresponding to the decrease in the magnetization of the other permanent magnet effected by said winding, and means for effecting relative adjustment of the permanent magnets, substantially as described.

4. The combination with two field-coils, of means for modifying the phases of the magnetic field produced by one of them, means in shunt to said last-named coil for further modifying the phase of its magnetic field, and means for changing the number of turns of the last-named coil in action, whereby the relative effect of the two field energizing-coils is changed, substantially as described.

5. The combination with two field-coils, of means in shunt of one of said coils for modifying the phase of its magnetic field, and means for changing the number of turns of the latter coil in action, whereby the relative effect of the two field energizing-coils will be changed, substantially as described.

Signed by me at Fort Wayne, county of Allen, State of Indiana, this 8th day of April, A. D. 1898.

THOMAS DUNCAN.

Witnesses:
JOHN E. DALTON,
HOMER V. CARPENTER.